United States Patent [19]

Sieminski et al.

[11] Patent Number: 5,888,664
[45] Date of Patent: Mar. 30, 1999

[54] METAL-AIR BATTERY WITH A REACTANT AIR PATHWAY

[75] Inventors: Dennis P. Sieminski; David A. Brammer, both of Atlanta; Edward R. Champion, Kennesaw, all of Ga.

[73] Assignee: AER Energy Resources, Inc., Smyrna, Ga.

[21] Appl. No.: 844,176

[22] Filed: Apr. 18, 1997

Related U.S. Application Data

[63] Continuation-in-part of Ser. No. 299,997, Sep. 1, 1994, Pat. No. 5,641,588.

[51] Int. Cl.⁶ .............................. H01M 12/06; H01M 8/04
[52] U.S. Cl. ................................................ 429/27; 429/34
[58] Field of Search ......................................... 429/27, 34

[56] References Cited

U.S. PATENT DOCUMENTS

| | | |
|---|---|---|
| 4,545,554 | 10/1985 | Latino et al. . |
| 4,620,111 | 10/1986 | McArthur et al. . |
| 4,894,425 | 1/1990 | Hellermann et al. . |
| 4,913,983 | 4/1990 | Cheiky . |
| 4,926,365 | 5/1990 | Hsieh . |
| 5,039,928 | 8/1991 | Nishi . |
| 5,143,341 | 9/1992 | Juster . |
| 5,153,817 | 10/1992 | Hosoi et al. . |
| 5,209,452 | 5/1993 | Goldberg . |
| 5,234,186 | 8/1993 | Powell . |
| 5,247,285 | 9/1993 | Yokota . |
| 5,323,291 | 6/1994 | Boyle . |
| 5,354,625 | 10/1994 | Bentz et al. . |
| 5,356,729 | 10/1994 | Sieminski et al. . |
| 5,387,477 | 2/1995 | Cheiky . |
| 5,506,749 | 4/1996 | Matsuda . |
| 5,536,590 | 7/1996 | Cheiky . |
| 5,560,999 | 10/1996 | Pedicini et al. . |
| 5,571,630 | 11/1996 | Cheiky . |
| 5,641,588 | 6/1997 | Sieminski et al. . |

FOREIGN PATENT DOCUMENTS

| | | |
|---|---|---|
| 0666523 | 8/1995 | European Pat. Off. . |
| A 05143192 | 9/1993 | Japan . |
| 9010956 | 9/1990 | WIPO . |
| 94/01898 | 7/1993 | WIPO . |
| 9409425 | 4/1994 | WIPO . |

OTHER PUBLICATIONS

MacWeek Magazine, advertisement for Thin Pack by VST Power Systems, Inc. (no date).
MacWeek Magazine, advertisement for Power Plate by Technöggin, Inc. (no date).
MacConnection Magazine, advertisement for Power Plate Rechargeable Power Packs (no date).
"Make My Day", PC Magazine, Aug., 1992, pp. 114–115.

*Primary Examiner*—John S. Maples
*Attorney, Agent, or Firm*—Jones & Askew, LLP

[57] ABSTRACT

A metal-air battery pack is disclosed for external assembly to a portable electronic device with a battery compartment. The battery pack electrically connects to the electronic device through an existing connector of the device that is located in the battery compartment of the device. Another aspect of the present invention provides a palm rest as part of a battery for a portable computing device. Another aspect of the invention provides a network of barriers defining an air pathway through a cathode air plenum to efficiently direct air to the air cathodes of the cells of the battery.

5 Claims, 11 Drawing Sheets

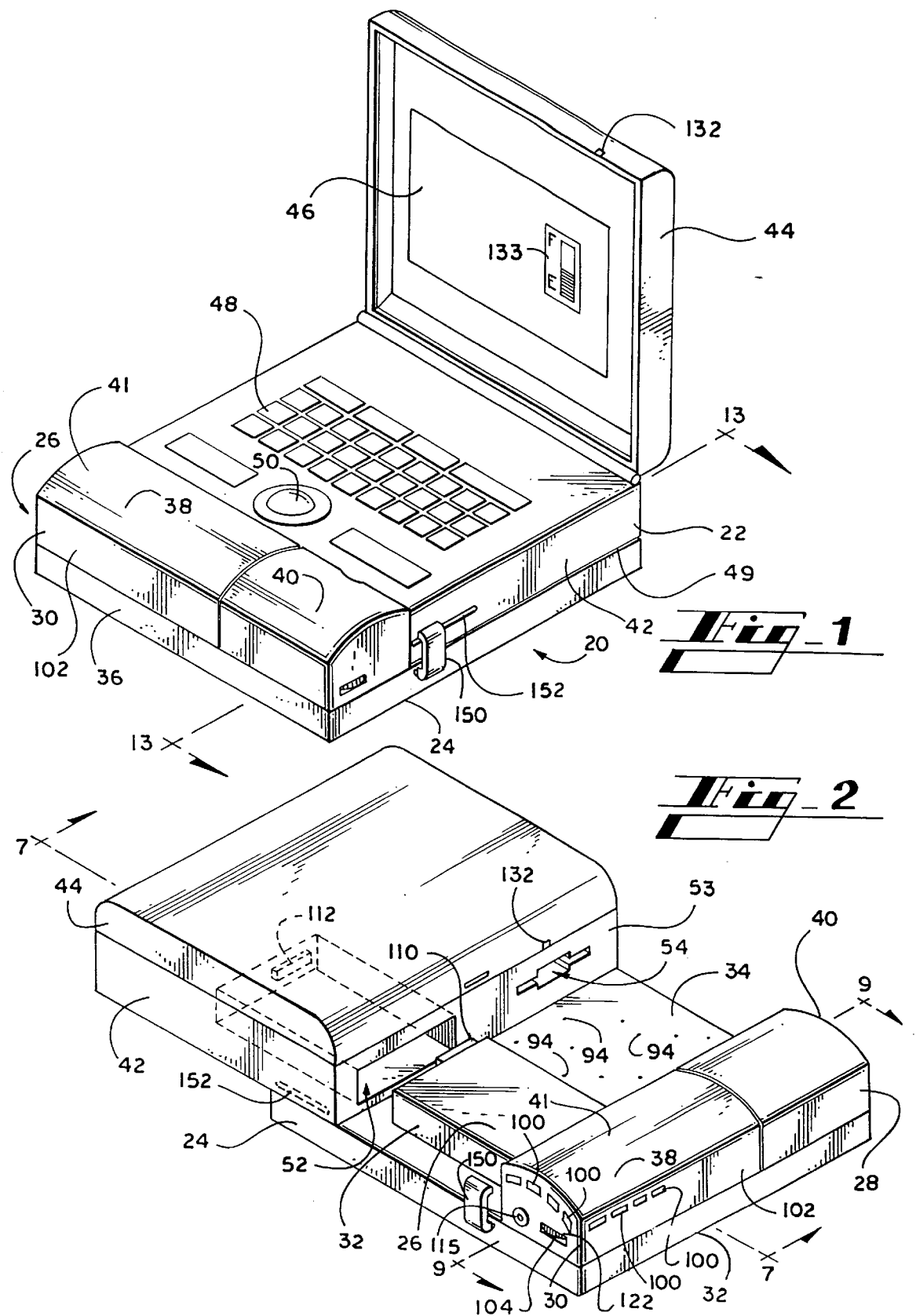

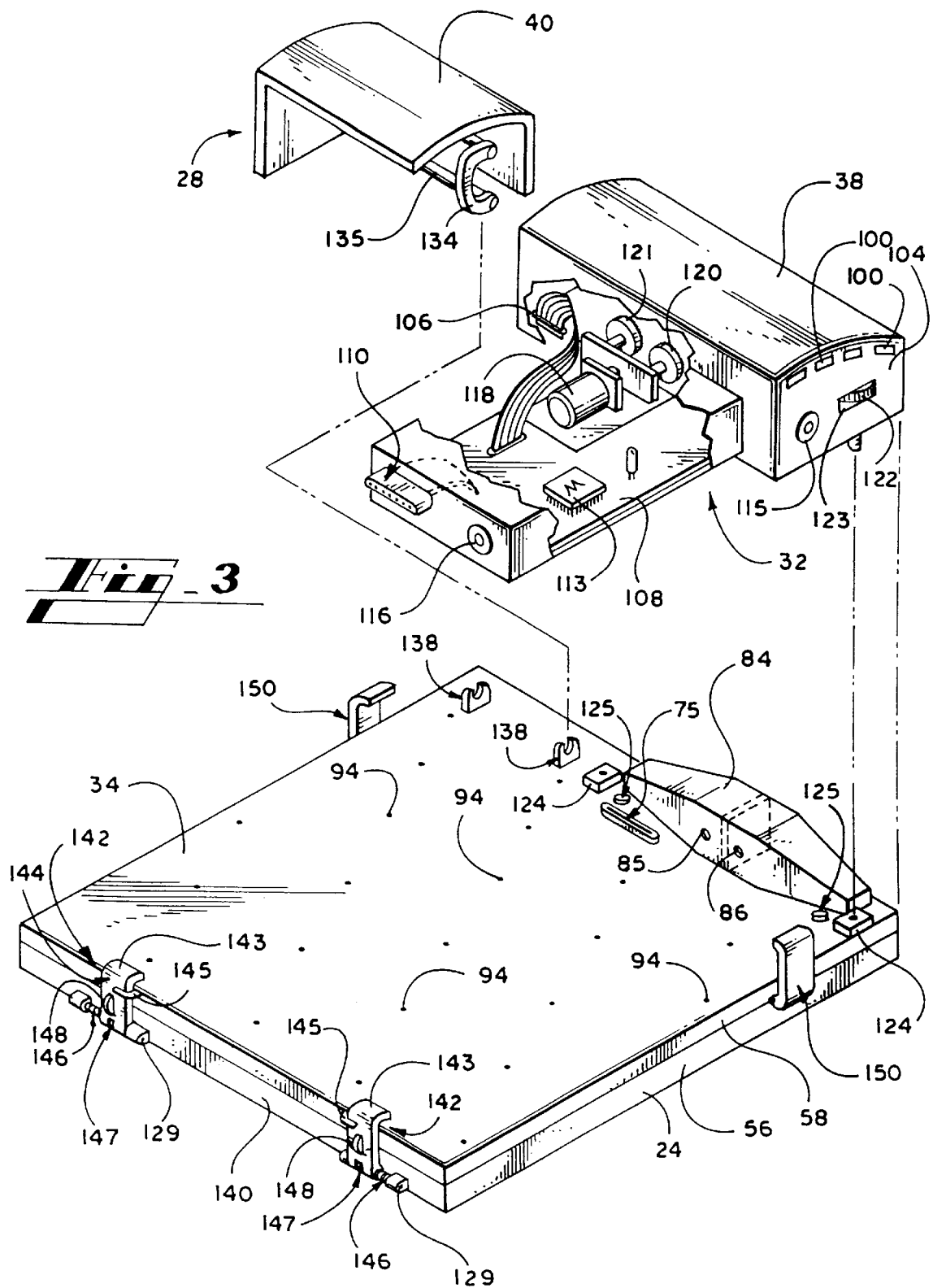

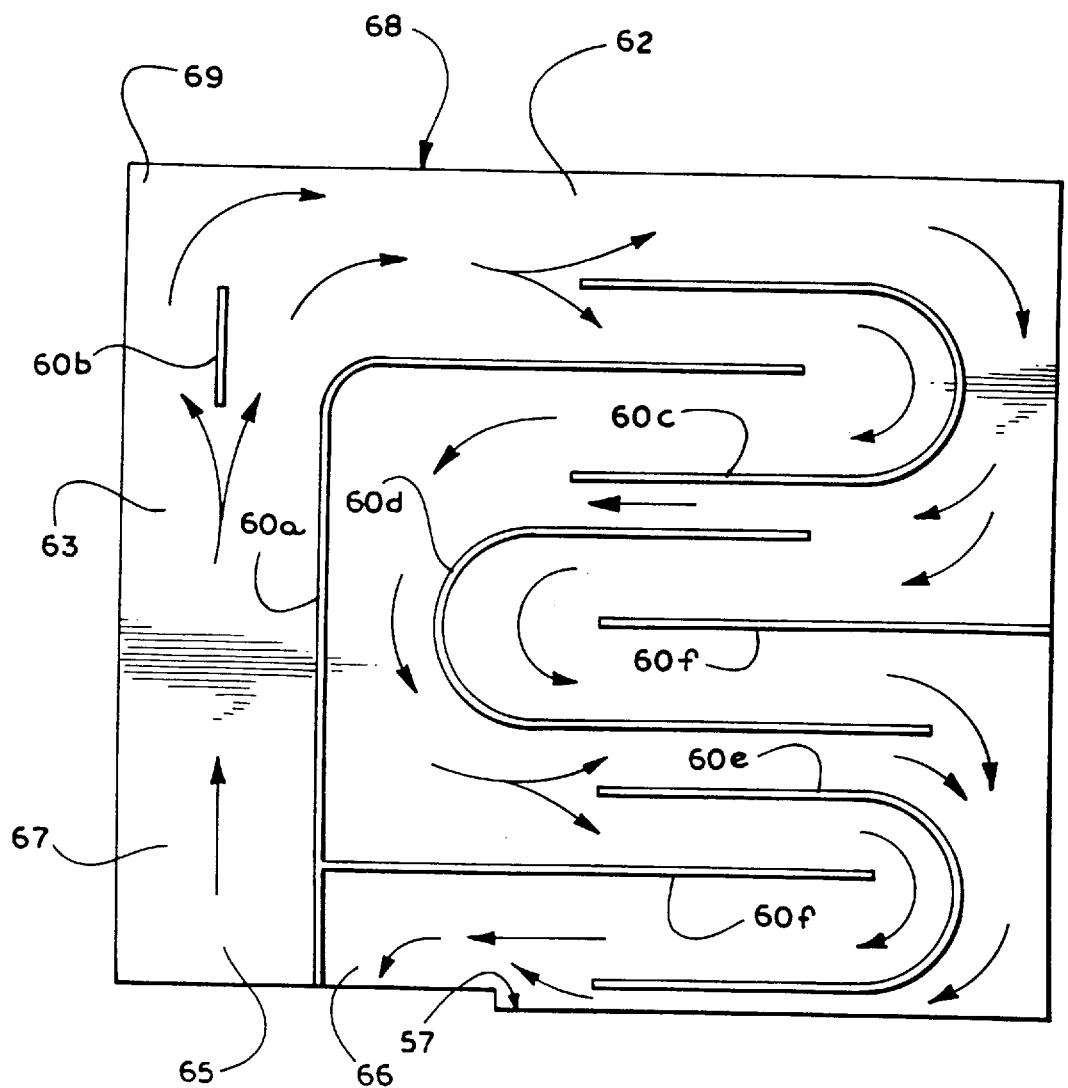
Fig_4

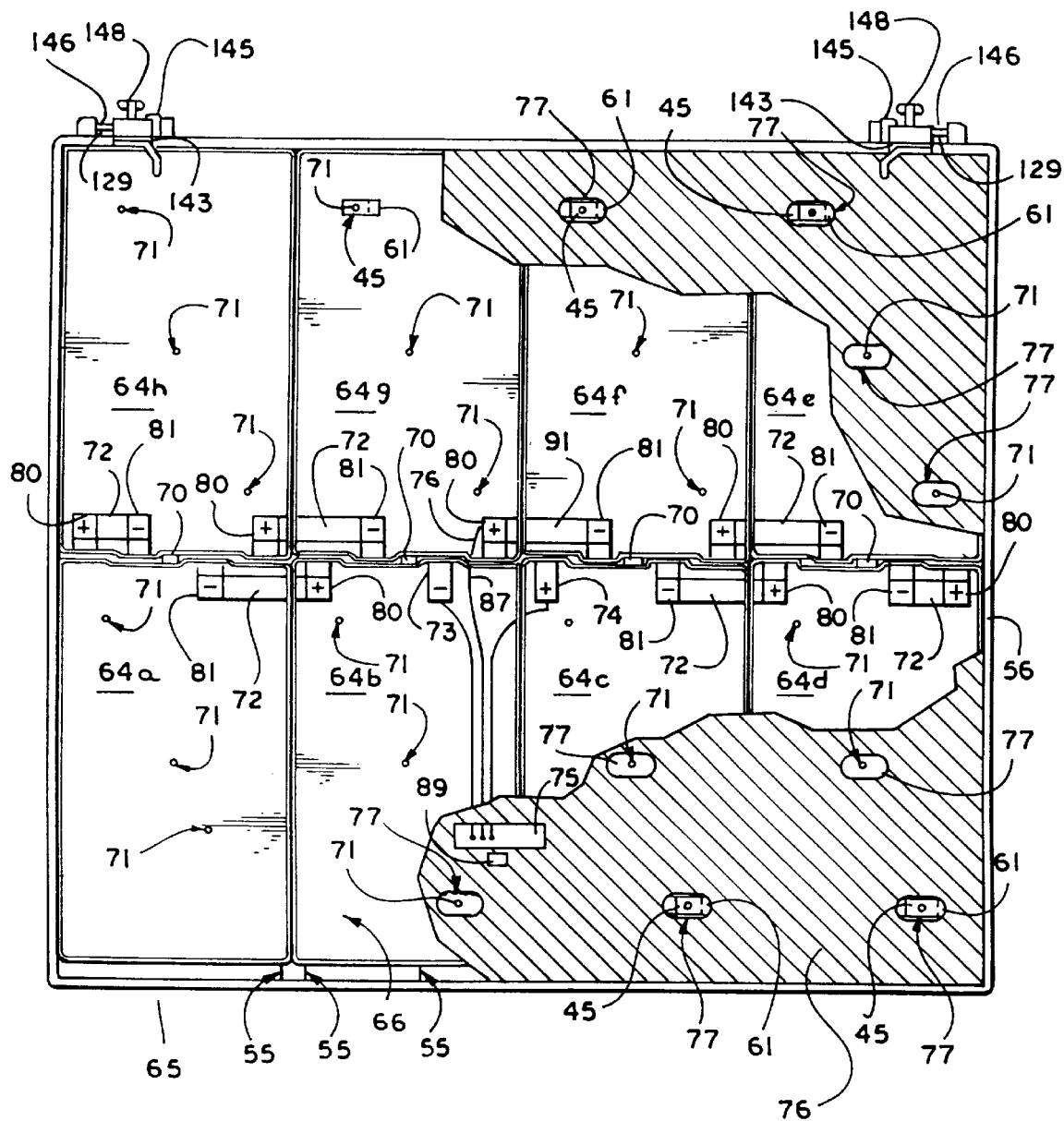
Fig_5

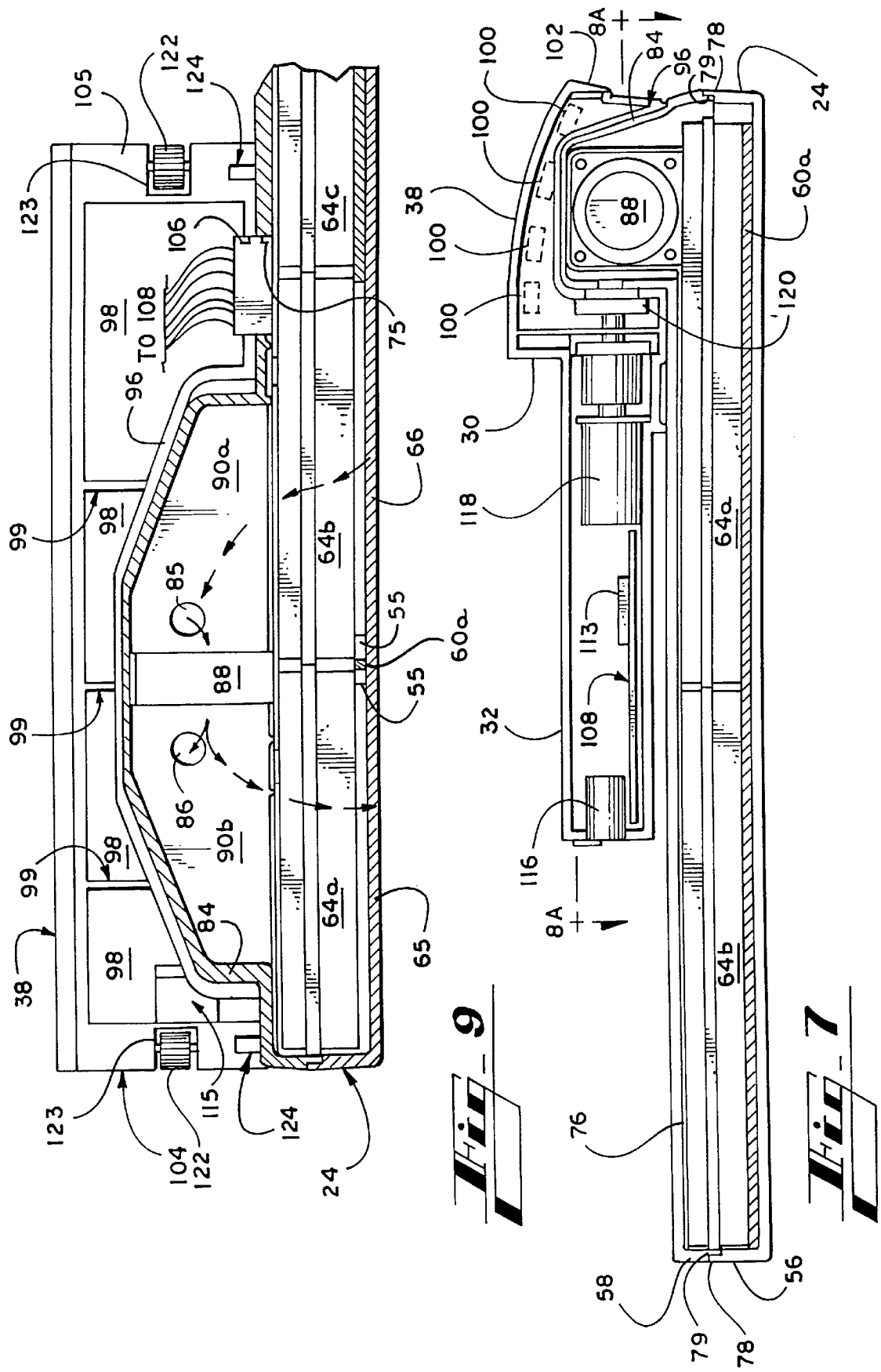

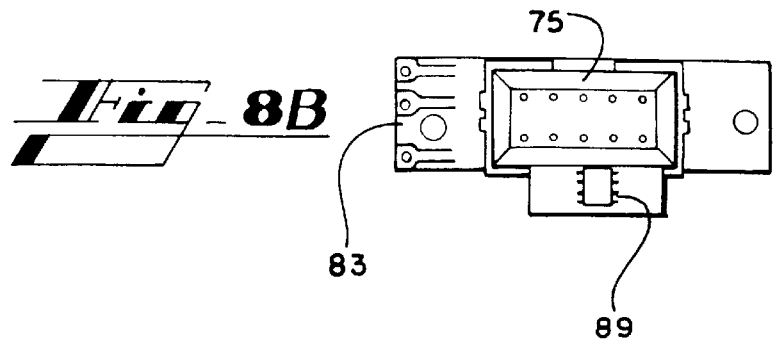
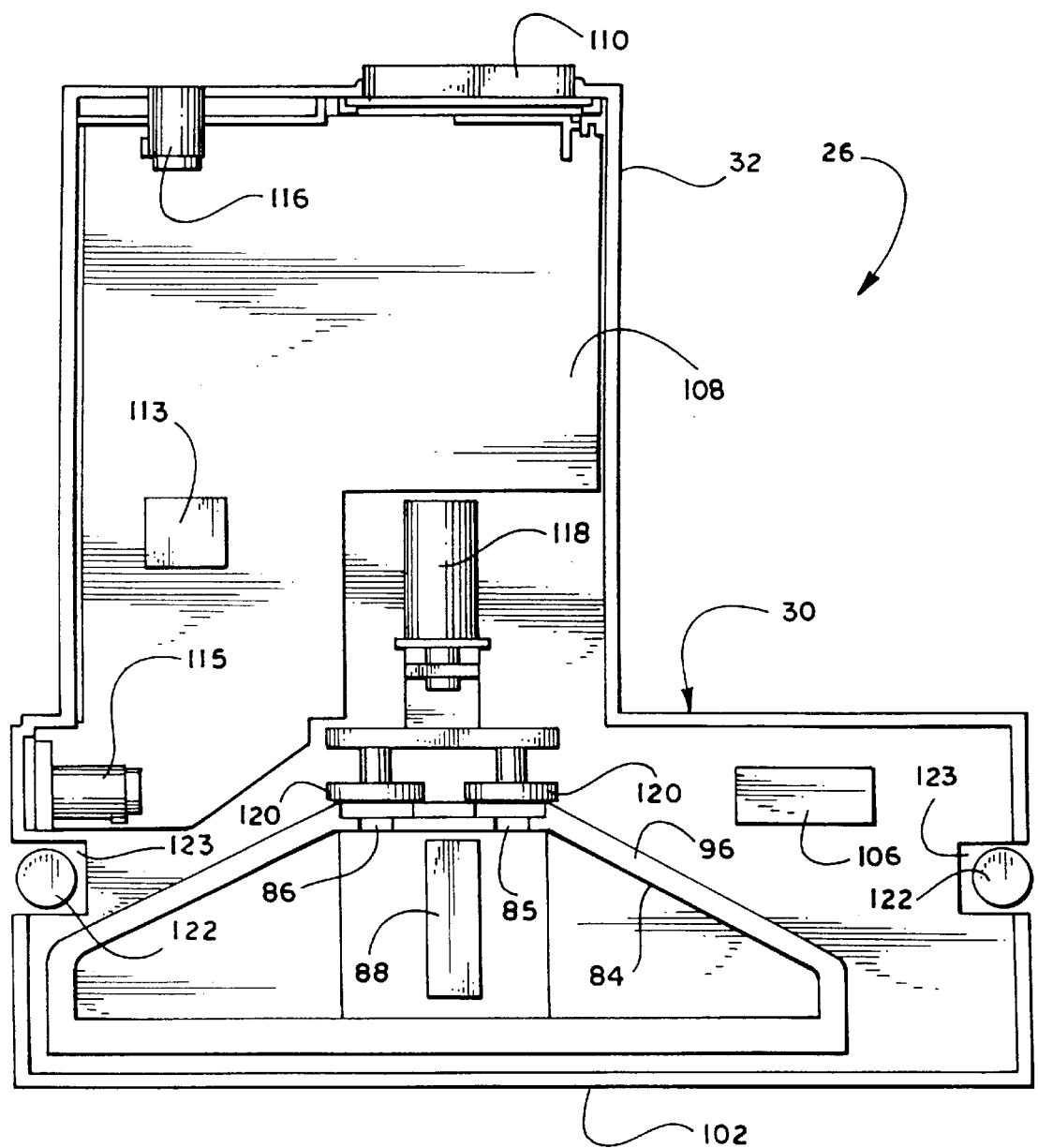

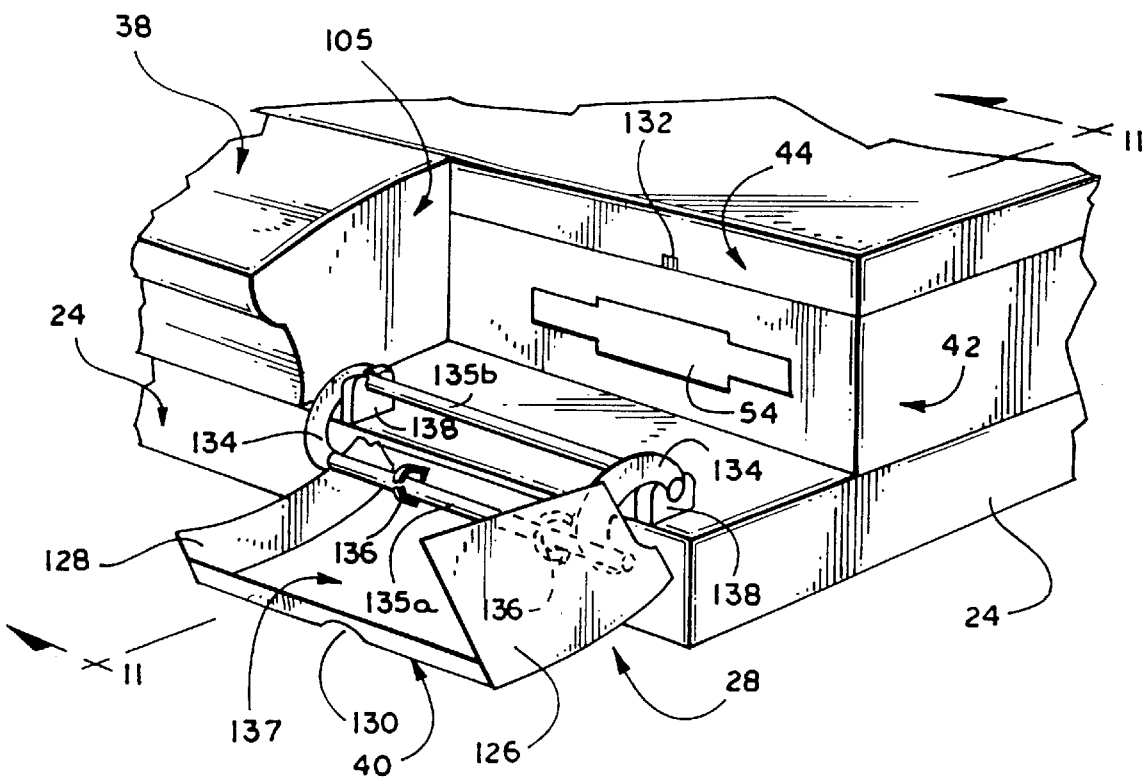
Fig_10
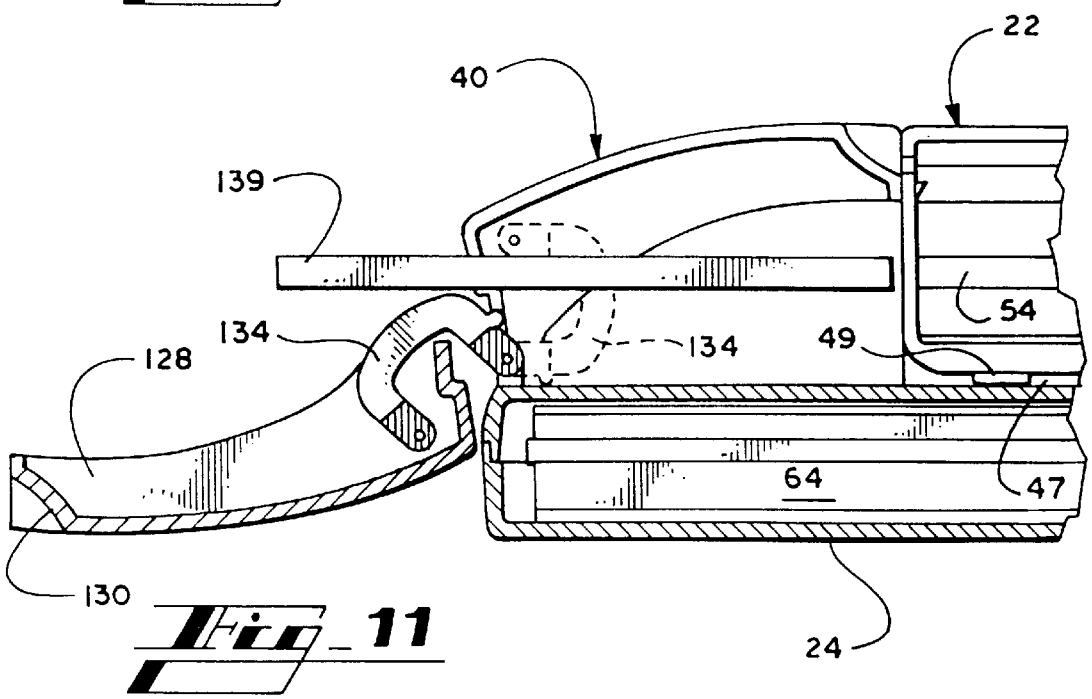
Fig_11

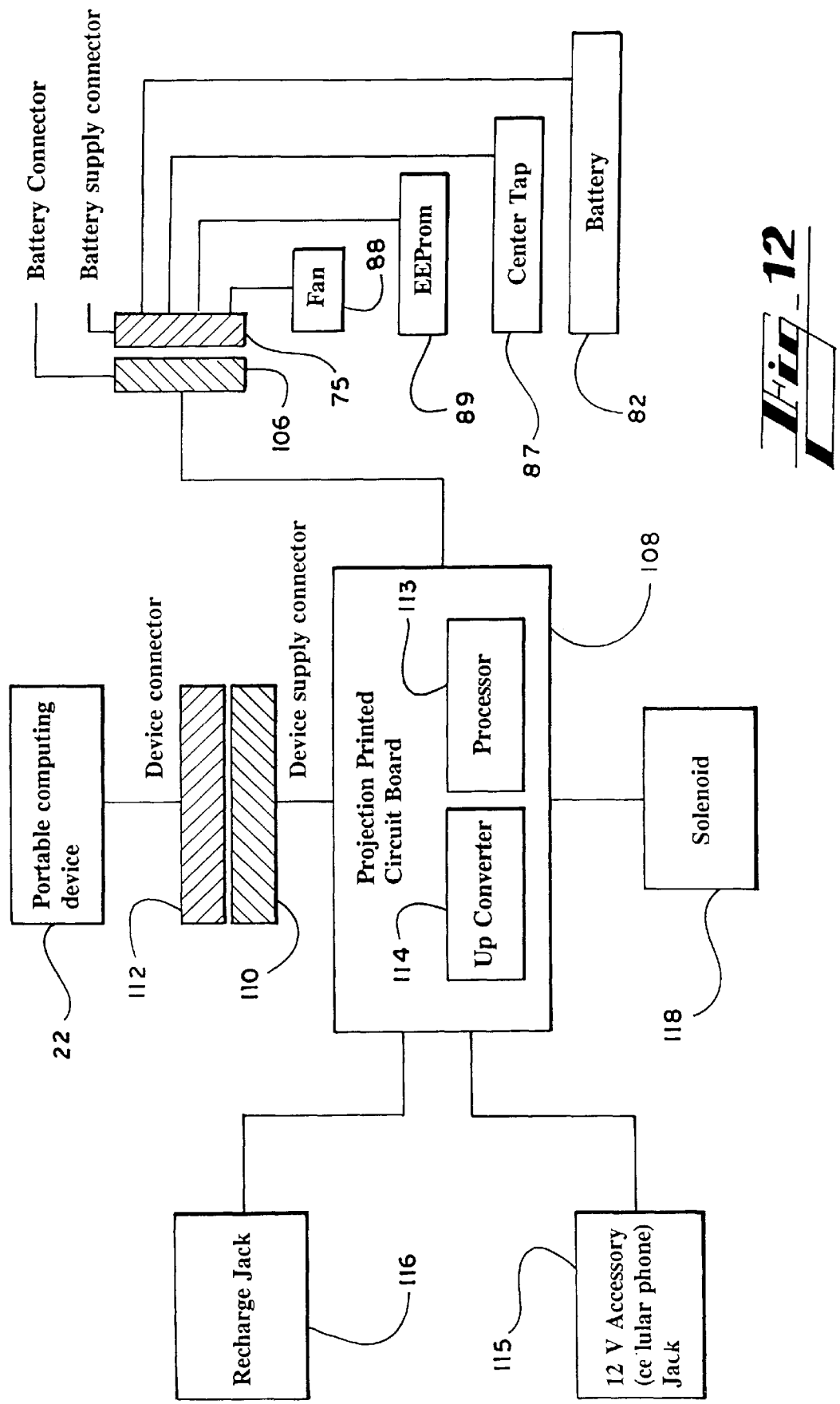
Fig_12

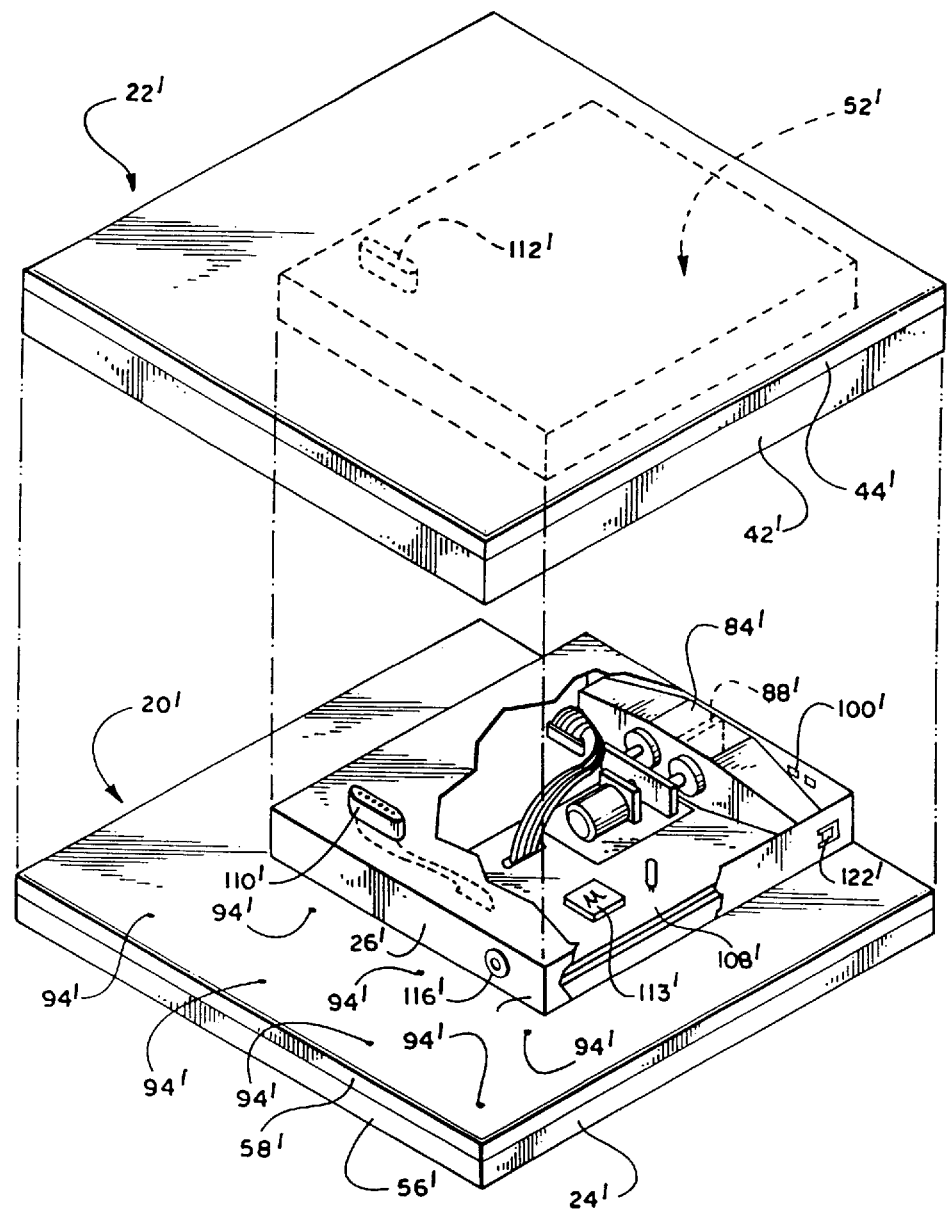
Fig_15

5,888,664

METAL-AIR BATTERY WITH A REACTANT AIR PATHWAY

CROSS-REFERENCE TO RELATED APPLICATION

This application is a continuation-in-part of U.S. application Ser. No. 08/299,997, filed Sep. 1, 1994, now U.S. Pat. No. 5,641,588.

TECHNICAL FIELD

The present invention relates generally to a retrofitting power source, and more particularly to a metal-air battery for use externally of electronic devices with a projection retrofitting into the battery compartment of the device.

BACKGROUND OF THE INVENTION

From the late 1970's through the present day the ability of electronic devices to perform a wide variety of tasks has continually expanded. This is especially true of general purpose digital computing devices which can efficiently process, store and manipulate large quantities of information. As a result, the use of personal computers has proliferated in businesses, homes, academic, and a multitude of other environments. Further, due to more recent advances in technology, the use of portable computers that are compact and relatively light weight so that they may be easily transported from one location to another have become common place.

A main benefit of portable computers is that they may be used while in transport between locations, such as on an airplane, or in a remote location. As used herein, the phase "remote location" means a location that is remote from a source of standard alternating current (AC) power. To enable use in remote locations, portable computers include a battery. Due to the size and weight constraints of portable computers, however, such internal batteries are fairly small in size. As a consequence, they have a limited capacity and typically provide only enough power for three-to-four hours of computer operation. After that, the portable computer must be transported to a source of AC power and the included battery recharged.

Thus, when it is desired to use a portable computer for more than three-to-four hours in a remote location it is now necessary to transport an extended power supply, generally a second external battery, in addition to the portable computer. In this case, when the included battery has been discharged, the external battery is used to power the computer for continued operation. Because the external battery must be portable, it should be compact, relatively light weight and convenient to transport. Further, because the external battery has a finite, although extended, capacity, it should be capable of communicating its charge status as well as other pertinent information to the portable computer.

Various types of external batteries have been used in the prior art. For example, nickel-cadmium and metal-hydride batteries that have a relatively low energy density and are therefore relatively heavy for the amount of power they supply. Thus, they are far from an ideal supply of power for portable applications.

Further the external batteries of the prior art often are not attachable to a portable computer, and thus must be transported as a separate unit. This makes it more difficult for a user to move his or her portable computer/external battery system from one location to another or from one point to another at a given location. Thus, there exists a need for a compact and lightweight external battery that can be attached to a portable computer.

Another problem associated with the external batteries of the prior art is that they supply power to the computer through an external power cord that plugs into an external power port. In such a system, power to the portable computer can be interrupted by a failure in the power cord caused by use over a period of time, by the cord being accidentally pulled out or by the cord's plug becoming loosened from the power port. This is significant because an interruption in the supply of power to a computer can cause a user to lose data. Thus, there exists a need for an external battery with a connection to a portable computer that will not become loosened or fail from use or transport of the computer.

Although portable computers are often able to monitor the state and status of an internal battery, there exists no known external battery that can be monitored by a portable computer in such a manner. Thus, a user cannot monitor the status of the battery directly from the computer as can be done for the included battery. As a result, the computer cannot warn the user of a low charge level in the external battery. Therefore, a need exists for an external battery that is compact, light weight and portable along with a portable computer that provides power in a secure manner and which can be monitored by the computer.

SUMMARY OF THE INVENTION

The present invention provides a better solution to solving the problems in the art described above by providing an improved battery pack for external assembly to a portable electronic device with a battery compartment. The battery pack electrically connects to the electronic device through an existing connector of the device that is located in the battery compartment of the device. Another aspect of the present invention provides a palm rest as part of a battery for a portable computing device.

Generally described, a first aspect of the present invention provides a metal-air battery, having an air chamber. The air chamber includes front, rear, and first and second opposing side walls, an air inlet and an air outlet adjacent to one another along the front wall, and a reactant air pathway for directing air across a plurality of electrochemical cells. The electrochemical cells are disposed in a generally rectangular array. The reactant air pathway comprises a network of barriers defining the reactant air pathway such that air is evenly disbursed about the air chamber and across the plurality of electrochemical cells. The network of barriers include a longitudinal barrier extending from the front wall between the air inlet and the air outlet to a position spaced from the rear wall; at least one transverse internal spacer barrier extending from the longitudinal barrier to a position spaced from the first side wall; and at least one transverse peripheral spacer barrier extending, between the front wall and the internal spacer barrier, from the first side wall to a position spaced from the longitudinal barrier. The transverse peripheral spacer barrier extends into a U-shaped barrier, the open end of which faces the first side wall.

Preferably, the U-shaped barrier includes an arm extending closer to the front wall than to the transverse peripheral barrier. The transverse internal spacer barrier may extend into a second U-shaped barrier, the open end of the second U-shaped barrier facing the longitudinal barrier.

The metal-air battery may further comprise a second internal spacer barrier extending from the longitudinal barrier to a position spaced from the first side wall, between the front wall and the transverse peripheral spacer barrier. The second transverse internal spacer barrier may extend into a third U-shaped barrier, the open end of the third U-shaped barrier facing the longitudinal barrier.

In another aspect of the present invention, a metal-air battery having an air chamber is provided. The air chamber includes a reactant air pathway for directing air across a plurality of electrochemical cells, the electrochemical cells disposed in a generally rectangular array. The reactant air pathway comprises a network of barriers defining the reactant air pathway such that air is evenly disbursed about the air chamber and across the plurality of electrochemical cells.

The network of barriers includes an L-shaped barrier, having a first leg and a second leg, the first leg of the L-shaped barrier disposed between an air inlet opening of the air chamber and an air outlet opening of the air chamber. The L-shaped barrier directs air passing into the air chamber through the air inlet opening rearwardly along an interior first side wall of the air chamber and then perpendicular along an interior rear wall of the air chamber. A second barrier is disposed between the second leg of the L-shaped barrier and the interior first side of the air chamber directing air from the air inlet opening into a corner defined by the intersection of the interior first side wall and the interior rear wall.

A plurality of U-shaped barriers are disposed in alternating orientation and disposed between the first leg of the L-shaped barrier and an interior second side wall of the air chamber, the plurality of U-shaped barriers receiving air directed along the interior rear wall of the air chamber. The plurality of U-shaped barriers also direct the air across an area defined between the first leg of the L-shaped barrier and the interior second side of the chamber. The plurality of U-shaped barriers further directing the air out of the air chamber through the air outlet opening.

A plurality of elongate spacer barriers extend into the plurality of U-shaped barriers directing air into the U-shaped barriers.

Preferably, the plurality of U-shaped barriers comprises a first U-shaped barrier, a second U-shaped barrier, and a third U-shaped barrier. The first U-shaped barrier may include first and second arms, the first U-shaped barrier disposed opposite the second leg of the L-shaped barrier such that the second leg of the L-shaped barrier extends into the first U-shaped barrier and between the first and second arms of the first U-shaped barrier. The first U-shaped barrier receives the air directed along the interior rear wall of the air chamber.

The second U-shaped barrier, may include first and second arms, the second U-shaped barrier being disposed adjacent first U-shaped barrier and between the L-shaped barrier and the interior second side wall. The second U-shaped barrier being oriented oppositely of the first U-shaped barrier, the second U-shaped barrier receiving air directed from the first U-shaped barrier. If desired, a first of the plurality of elongate spacer barriers extends outward from the interior second side wall of the air chamber between the first and second arms of the second U-shaped barrier.

The third U-shaped barrier may include first and second arms, the third U-shaped barrier disposed adjacent the second U-shaped barrier and between the L-shaped barrier and the interior second side wall. The third U-shaped barrier is oriented oppositely of the second U-shaped barrier, the third U-shaped barrier receiving air directed from the second U-shaped barrier. The third U-shaped barrier directs the air to the air outlet opening and out of the air chamber. Preferably, a second of the plurality of elongate spacer barriers extends outward from the first leg of the L-shaped barrier between the first and second arms of the third U-shaped barrier.

In another aspect of the present invention, a metal-air battery having an air chamber for supplying air to an array of electrochemical cells is provided. The air chamber comprises a generally planar interior surface, an air inlet opening for allowing air to pass into the air chamber, an air outlet opening for allowing air to pass out of the air chamber, and a network of barriers defining an air pathway through the air chamber, such that air is disbursed over the generally planar surface.

The network of barriers include an L-shaped barrier, having a first leg and a second leg, the first leg of the L-shaped barrier disposed between the air inlet opening and the air outlet opening. The L-shaped barrier forms an L-shaped air inlet channel extending rearwardly along the first leg from the air inlet opening along an interior first side wall of the air chamber and then along the second leg parallel to an interior rear wall of the air chamber. Preferably, a second barrier is disposed interior of the air inlet channel directing air from the air inlet opening into an interior vertex of the L-shaped air inlet channel.

A plurality of U-shaped barriers are disposed in alternating orientation, the plurality of U-shaped barriers disposed between the L-shaped barrier and an interior second side wall of the air chamber. The plurality of U-shaped barriers direct air in a serpentine-shaped path over an area defined between the first leg of the L-shaped barrier and the interior second side wall of the air chamber. A first of the plurality of U-shaped barriers is disposed such that the open end of the first of the plurality of U-shaped barriers receives air from the air inlet channel. The first of the plurality of U-shaped barriers directing air received from the air inlet channel to the remaining of the plurality of U-shaped barriers. A final of the plurality of U-shaped barriers directs air received from an adjacent U-shaped barrier to the air outlet opening and out of the air chamber.

A plurality of elongate spacer barriers are disposed between the arms of each of the remaining of the plurality of U-shaped barriers and between the arms of the final of the plurality of U-shaped barriers. The plurality of elongate spacer barriers direct air into the remaining of the plurality of U-shaped barriers and into the final of the plurality of U-shaped barriers.

Further objects, features and advantages of the present invention will become apparent upon reviewing the following description of preferred embodiments of the invention, when taken in conjunction with the drawings and appended claims.

BRIEF DESCRIPTION OF THE DRAWINGS

FIG. 1 is a perspective view of a metal-air battery externally assembled to a portable computing device in accordance with the present invention.

FIG. 2 is a perspective view from a different angle of the metal-air battery of FIG. 1 disassembled from the portable computing device.

FIG. 3 is an exploded view of the metal-air battery of FIG. 1 showing the cell housing, the removable projection extending from the housing and the disk access door.

FIG. 4 is a diagrammatic view of barriers defining the flow path of reactant air beneath the air cathode assemblies of the metal-air cells that comprise the battery.

FIG. 5 is a top plan view of metal-air cells inside the bottom tray of the housing showing the foam sealing pad (in part) and the interconnection of the battery cells.

FIG. 7 is a side cross sectional view taken along line 7—7 of FIG. 2 showing the removable projection extending parallel to and in spaced apart relation from said upper surface of said housing.

FIG. 8A is a horizontal cross sectional view of the projection, looking down, taken along line 8A—8A of FIG. 7, showing the projection printed circuit board.

FIG. 8B is a bottom plan view of the metal-air battery printed circuit board showing the battery connector and the EEProm.

FIG. 9 is a vertical cross sectional view of the projection and of the battery looking to the rear taken along line 9—9 of FIG. 2.

FIG. 10 is a pictorial view of the disk access door in the open position allowing access to the disk drive of the portable computing device.

FIG. 11 is a side cross sectional view of the door and of the battery taken along line 11—11 of FIG. 10, showing the door pivoted down and away from the portable computing device below the plane extending from the disk drive.

FIG. 12 is a block diagram of the electrical connections of circuitry in the projection to the metal-air battery and to the portable computing device in accordance with the present invention.

FIG. 15 is a perspective view of an alternate configuration of a metal-air battery in accordance with the present invention for external assembly to a portable computing device.

DETAILED DESCRIPTION

Figure 6:
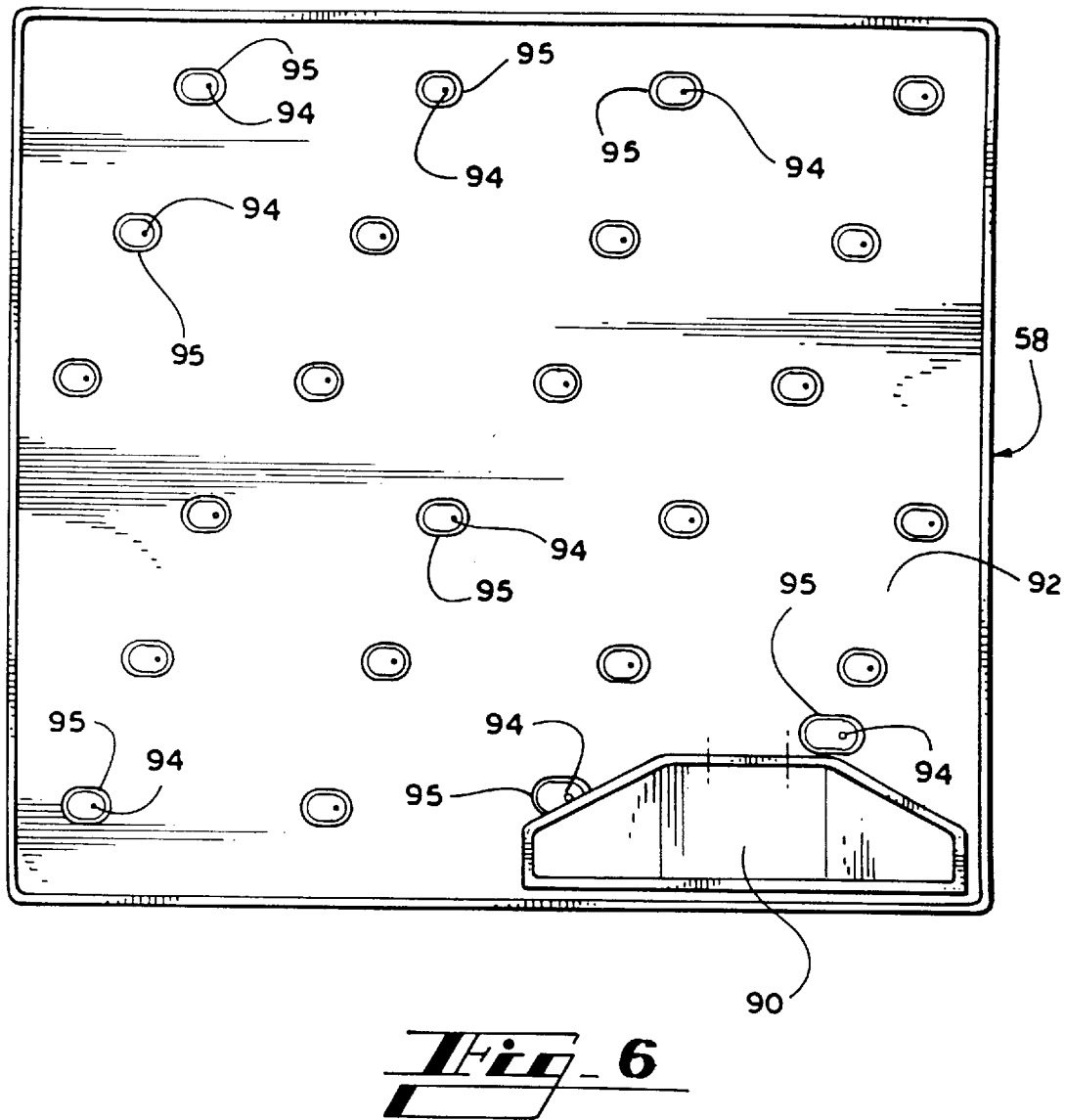
FIG. 6 is a bottom plan view of the inner surface of the top tray of the housing showing the hydrogen vent holes and the air plenum.

Referring now in more detail to the drawings, in which like numerals refer to like parts throughout the several views, FIGS. 1–3 show a battery pack 20 in accordance with the present invention for external attachment to a conventional portable computing device 22. This invention will be described with specific reference to a portable computing device. However, this invention should be understood as applicable to other portable electronic devices with a battery compartment therein.

The battery pack 20 comprises three main elements, a cell housing 24, a projection assembly 26 and a disk access door 28. The battery housing 24 forms the base of the battery pack 20 with the projection assembly 26 and the disk access door 28 removably mounted to an upper surface 34 of the battery housing 24 along a front edge 36.

The projection assembly 26 further comprises an air plenum section 30 and a plug extension section 32. An upper surface 38 of the air plenum section 30 and an upper surface 40 of the disk access door 28 together form a palm rest 41 for use in connection with the portable computing device 22.

The conventional portable computing device 22 comprises a base 42 and a hinged display 44 which forms a cover. The base 42 includes a surface mounted keyboard 48 and track ball 50. The base 42 further includes an internal battery compartment 52 and an internal floppy disk drive 54, which both open at a front wall 53 of the base 42. The hinged display 44 of the portable computing device 22 includes a display screen 46.

As described in more detail below, and shown in FIG. 2, the battery pack 20 is assembled to the computing device 22 by aligning the plug extension section 32 with the battery compartment 52 and sliding the battery pack 20 toward the front wall 53 of the portable computing device 22.

Turning now in more detail to the elements of the battery pack 20, the cell housing 24 (shown in FIGS. 3–7) comprises a bottom tray 56 and a top tray 58, which may be cast or injection molded plastic. As shown in FIG. 4, spacer barriers 60 are each 0.090 inch in height and disposed along an inner surface 62 of the bottom tray 56 to create a reactant air pathway 63 between the inner surface 62 and a plurality of metal-air battery cells 64 (shown in FIG. 5).

The preferred embodiment of this invention will be described with specific reference to metal-air battery cells. Metal-air battery cells are preferred due to their relatively high energy density. Metal-air batteries have a relatively high energy density because they utilize oxygen from ambient air as a reactant in the electrochemical reaction rather than a heavier material, such as a metal oxide or other depolarizable metallic composition. However, this invention should be understood as applicable to other types of battery cells. Those skilled in the art will understand that the reactant air pathways and associated components for providing an air flow to the metal-air cells are not necessary if the battery cells do not use oxygen from ambient air as a reactant.

The spacer barriers 60 are arranged such that the reactant air pathway 63 does not have areas of static air and such that the velocity of all the air in the reactant air pathway 63 is approximately the same. More particularly, a spacer barrier 60a separates an air inlet 65 of the reactant air pathway 63 from an air outlet 66. Spacer barrier 60a is L-shaped and forms an L-shaped inlet channel 67 in the reactant air pathway 63 that extends rearwardly from the air inlet 65 at the front edge 36 and then parallel to a back edge 68. A spacer barrier 60b is disposed in the inlet channel 67 to prevent a static air pocket in a corner 69. Three U-shaped spacer barriers, 60c, 60d and 60e are disposed in alternating orientation for receiving air flow from the inlet channel 67. An elongated spacer barrier is disposed between the arms of each U-shaped spacer barrier to create a serpentine air flow from the inlet channel 67 to the air outlet 66. In the case of the U-shaped spacer barrier 60c, the elongated spacer barrier is formed by the arm of the L-shaped spacer barrier 60a that is parallel to the back edge 68. For the remaining U-shaped spacer barriers 60d and 60e, the elongated spacer barriers are separate spacer barriers 60f.

Each metal-air cell 64 includes an air permeable cathode and a metallic anode separated by an aqueous electrolyte (not shown). The metal-air cells further comprise hydrogen vents 71 disposed opposite of the air permeable cathode. The hydrogen vents 71 discharge hydrogen generated by the metal-air cells during recharging.

A flap valve 45 is mounted over each hydrogen vent 71 to prevent air and other gasses from entering the cells 64 via the hydrogen vents 71 while still allowing hydrogen to escape. The flap valve 45 comprises a strip of thin, flexible, plastic material that is deformed under pressure but that resiliently returns to its original shape and position in the absence of such pressure. A portion 61 of the flap valve 45 is secured to the top of the cell 64 adjacent to the vent 71, preferably by means of hot melt adhesive. The unsecured portion of the flap valve 45 extends laterally from the secured portion 61 to cover the adjacent vent 71. In its undeformed position, the flap valve 45 seals over the vent 71 against the top of the cell 64 to prevent air and other gasses from entering the cell 64. When hydrogen is generated in the cell 64, the pressure causes the thin strip of flexible material to deform away from the vent 71 and thus allows the hydrogen to escape through the vent 71. Upon the release of the hydrogen, the pressure in the cell returns to normal and the flap valve reseals over the hydrogen vent 71.

The anode of a metal-air cell is made from metals which can be oxidized during discharge in a metal-air cell to produce electrical energy. Such metals include lead, zinc, iron, cadmium, aluminum and magnesium. Zinc is the preferred metal for the anode because of its availability, energy density, safety, and relatively low cost. KOH is the preferred electrolyte. A suitable electrolyte is an aqueous electrolyte including group I metal hydroxides such as LiOH, NaOH, KOH, CsOH, or the like. The preferred metal-air cell is described in U.S. Pat. No. 5,306,579, which is incorporated herein by reference.

The metal-air battery cells 64 are disposed upon the spacer barriers 60 as shown in FIG. 5, with the air cathode open to the reactant air pathways 63. The metal-air cells 64 are held in place by stops 55 which extend inward from the front inner side 57 of the bottom tray 56 and posts 70 which extend upward from the bottom tray 56.

The metal-air cells 64 each include a positive electrode 80 and a negative electrode 81, which are electrically connected in series by a plurality of strips 72. A pair of terminals, negative terminal 73 of the cell 64b and a positive terminal 74 of the cell 64c, provide the power output of the battery. The electrically connected metal-air cells 64 together form a metal-air battery 82, which is wired to a battery supply connector 75. The metal-air battery of the preferred embodiment has eight (8) metal-air cells which generate 1 volt each, for a total of 8 volts. A center tap 87 is separately wired from a central strip 91 to the battery supply connector 75. As explained below, the center tap 87 allows the cells 64 to be monitored as two groups during recharging.

The battery supply connector 75 is mounted on a printed circuit board 83 which also holds an EEProm 89 for storing the state of the metal-air battery 82 when it is disconnected from the portable computing device 22. The printed circuit board 83 is shown in FIG. 8B.

A foam sealing pad 76 is disposed over the metal-air battery cells 64 and covers the area of the bottom tray 56 except for the air inlet 65 and the air outlet 66 of the reactant air pathway 63. An opening 77, however, is provided in the foam sealing pad 76 directly above each hydrogen vent 71 of the metal-air battery cells 64. The pad 76 prevents air leakage from the reactant air flow below the cells into the space above the cells, and provides a gasket to seal around the vents 71 when the top 58 is installed. Alternately, the spaces between the cells and the spaces between the cells and the housing can be sealed by beads of hot melt adhesive.

The bottom tray 56 includes an extended lip 78 around its sides that mates with an indentation 79 on the top tray 58 to form a moisture seal. The seal is necessary to help prevent water loss from the cells, which would result in decreased battery output and life time.

A hollow protrusion 84 integrally molded with the top tray 58 extends upward from the upper surface 34 of the top tray 58. The protrusion 84 defines an air inlet ventilation hole 85 and an air outlet ventilation hole 86 in a rear wall of the protrusion 84, spaced a short distance apart. A fan 88 is positioned across the interior of the protrusion 84, dividing it into an inlet air plenum 90a and an outlet air plenum 90b, as best shown in FIGS. 8A and 9. The fan 88 is bounded by a gasket 51 which seals inlet plenum 90a from outlet plenum 90b except for the flow of air directed by the fan 88. When the metal-air battery 82 is in use, the ventilation holes are open to allow ambient air to flow into the housing 24 and thus through the reactant air pathway 63 and across the air cathodes of the metal-air cells 64.

As shown in FIGS. 3 and 6, the top tray 58 of the housing 24 defines a plurality of hydrogen vent holes 94. The hydrogen vent holes 94 correspond to the hydrogen vents 71 of the metal-air cells 64. The hydrogen vent holes 94, however, are slightly offset from the hydrogen vents 71 such that an object pushed through a hydrogen vent hole 94 of the top tray 58 will not enter the corresponding hydrogen vent 71 and damage a metal-air cell.

A boss 95 extends from the top tray 58 around each hydrogen vent hole 94. Each boss 95 is sized to encompass the corresponding hydrogen vent 71 and the opening 77 in the foam sealing pad 76 directly above such hydrogen vent of the battery cells 64. The boss 95 allows hydrogen to vent outside of the housing 24 by way of a hydrogen vent hole 94 while sealing against the foam sealing pad 76 to prevent hydrogen from escaping into other spaces of the housing 24. Thus, hydrogen released by a cell 64 enters the area surrounded by the boss 95 and then exits the cell housing 24 through the vent hole 94. From the vent hole 94, the released hydrogen enters into a space 47 formed between the upper surface 34 of the cell housing 24 and the bottom of the portable computing device 22. The housing 24 and the computer 22 are held in spaced apart relation by a plurality of legs 49 of the computer 22. If a computer does not include legs 49, a plurality of bosses (not shown) may be provided on the upper surface 34 of the housing 24 such that the hydrogen may vent out from under the computer between the bosses.

The air plenum section 30 of the projection assembly 26 includes a downwardly opening cavity 96 having the same horizontal cross sectional shape as the protrusion 84 of the housing 24. The projection assembly 26 may be installed in the position shown in FIG. 2 by placing the cavity 96 over the protrusion 84. As shown in FIG. 7, a space 98 remains at the top of the cavity 96 above the protrusion 84 and under an upper surface 38 when the air plenum section 30 is installed. The space is open to ambient air by way of openings 100 in a front wall 102 and a side wall 104 of the air plenum section 30. A plurality of supports 99 provide support for the upper surface 38 such that it may be used as a palm rest 41.

A pair of thumbscrews 122 are mounted in recesses 123 on the air plenum section 30 for securing the projection assembly 26 to the cell housing 24. The thumbscrews 122 extend downward toward a pair of threaded retainers 124 formed on the top 58 of the cell housing 24. The air plenum section 30 is aligned for attachment with the cell housing 24 by a pair of locator pins (not shown) that extend downward toward a pair of openings 125.

The plug extension 32 of the projection assembly 26 is a hollow box fixed at an open end thereof to the air plenum section 30. The plug extension 32 extends to the rear spaced a short distance above the top 58 of the cell housing 24. The plug extension 32 includes a printed circuit board 108, a device supply connector 110, and a solenoid valve assembly 118, as will be described in detail below. A block diagram detailing the electrical connections of the projection assembly 26 to the metal-air battery 82 and to the portable computing device 22 is shown by FIG. 12.

A battery connector 106 is provided in the air plenum section 30 of the projection assembly 26 for engagement with the battery supply connector 75 of the housing 24. The battery connector 106 is electrically wired to the projection printed circuit board 108 in the plug extension 32 of the projection assembly 26. An up converter 114 is provided on the projection printed circuit board 108 to convert the 8 volts of the metal-air battery to the 12 volts needed to operate the portable computing device 22.

The projection printed circuit board 108 is electrically connected to the device supply connector 110 as shown in FIG. 3. The device supply connector 110 engages a device connector 112 in the battery compartment 52 of the computer 22 when the battery pack 20 is assembled to the computer 22. The device connector 112 is electrically connected to the portable computing device 22. Thus, power is supplied to the portable computing device 22 through the device connector 112.

A microprocessor 113 is provided on the projection printed circuit board 108 for processing signals from the battery and from the portable computing device 22. Signals are received and sent between the portable computing device 22 and the microprocessor 113 through the device connector 112.

As show particularly in FIGS. 8A and 12, the projection printed circuit board 108 is further electrically connected to a 12 volt accessory jack 115, a recharge jack 116 and the solenoid 118. The accessory jack 115 is provided in a side wall 104 of the air plenum section 30 for powering an electronic device such as a cellular telephone. The microprocessor 113 disables the accessory jack 115 while the portable computing device 22 is drawing significant power to prevent interference with the operation of the portable computing device 22. For example, the jack 115 may be disabled when the computer 22 exits a "sleep" state and becomes active.

The recharge jack 116 is disposed in a wall of the plug extension 32 and electrically connected to the metal-air battery 82 through the projection printed circuit board 108. A recharger (not shown) may be plugged into the jack 116 when the battery 20 is removed from the computer 22. It will be appreciated by those skilled in the art, however, that the recharge jack 116 may be located in an exterior wall of the projection assembly 30 such that it remains exposed when the battery pack 20 is assembled to the computing device 22. In such a configuration, disassembly would not be necessary to plug the recharger into the jack 116. Additionally, a device recharge jack (not shown) of the portable computing device 22 may be used as the recharge jack 116 if compatible with the battery pack 20.

The solenoid 118 has dual piston rods extending toward the protrusion 84, bearing an inlet seal pad 120 and an outlet seal pad 121. When the piston rods retract and extend, the inlet pad 120 opens and closes the air inlet ventilation hole 85 and the outlet pad 121 opens and closes the air outlet ventilation hole 86. Thus, upon receipt of a power on signal from the computing device 22, the microprocessor 113 energizes the solenoid 118 to open the air ventilation holes.

As shown by FIGS. 10–11, the disk access door 28 is pivotally mounted to the cell housing 24 by a pair of U-shaped hinges 134 having an open end facing the disk access door 28. The U-shaped hinges 134 are spaced apart by a pair of rods 135 which are pivotally mounted to the disk access door 28 and to the cell housing 24. A first rod 135a is secured to an inner surface 137 of the disk access door 28 by snapping into a first pair of retainers 136. A second rod 135b is secured to the upper surface 34 of the cell housing 24 by a second pair of retainers 138 molded on the housing 24, as shown in FIG. 3.

The disk access door 28 includes an exposed side wall 126 and an interior wall 128. The exposed wall extends from the upper surface 40 to the cell housing 24. The interior wall 128 extends only a portion of the distance from the upper surface 40 to the cell housing 24. A cutout 130 is provided on the upper surface 40 so that the door does not cover a microphone 132 on the hinged display 44 of the portable computing device.

As a result of the U-shaped hinges 134, the disk access door 28 pivots around two axes and opens to a position down and away from the portable computing device below a plane extending from the disk drive 54. Thus a removable disk 139 may be inserted into the disk drive 54 without removing the battery pack 20 from the portable computing device.

Figure 13:
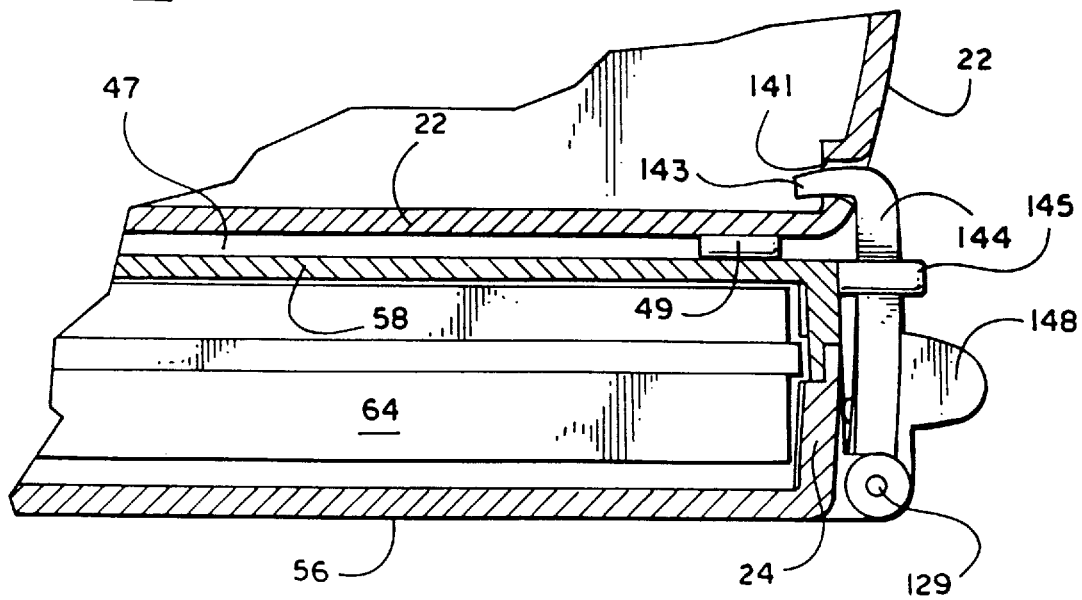
FIG. 13 is a side cross sectional view of the metal-air battery externally assembled to the portable computing device taken along line 13—13 of FIG. 1, showing the attachment clip engaged with the portable computing device in accordance with the present invention.

The assembled battery pack 20 is secured to the portable computing device 22 by the insertion of the extension 32 into the battery compartment 52 and by two set of clips. A first set of clips 142 are pivotally attached to the backside 140 of the cell housing 24 as shown in FIGS. 3 and 13. The clips 142 each comprise an elongated member 144 having a curved extension 143 opposite the pivoting end for engagement with a mating opening 141 of the computing device 22. A beveled hook 145 is provided on the cell housing 24 for securing each clip 142 in its engaged position.

The clips 142 are laterally biased toward the hook 145 by first spring 146 mounted on the clip's pivot axle 129 and pivotally biased toward the hook 145 by a second spring 147. The second spring 147 is also mounted on the pivot axle 129 and includes an extending straight end that presses against the clip 142 in a conventional manner. A handle 148 is provided on each clip 142 for positioning the clip 142. Pressure on the clip 142 causes it to slide past the beveled hook 145 and to snap in place under the force of the spring 146.

A second pair of upwardly extending clips 150 is attached to the cell housing 24 in a stationary position. When the battery pack 20 is assembled to the computing device 22, each stationary clip 150 slidingly engages a boss 152 on the base 42 of the computing device 22 near the front wall 53. Thus, the computing device 22 is secured at the front, back and sides to the battery pack 20.

When the portable computing device 22 is to be operated, the user opens the hinged display 44 and turns on the portable computing device 22. The portable computing device 22 sends a signal to the battery pack 20 through the device connector 112. The signal is received by the microprocessor 113 which energizes the fan 88 and the solenoid 188, which retracts the pads 120 and 121 from the ventilation openings 85 and 86, respectively.

Air enters the hollow space 98 through openings 100 and, as shown particularly in FIG. 9, is drawn into the air plenum 90 through the air inlet ventilation opening 85 by the fan 88. Next, the air flows downward to air inlet 65 and then into the reactant air pathway 63. In the reactant air pathway the oxygen from the ambient air is converted at the cathode to hydroxide ions which react with the anode to release water and electrons to provide electrical energy. The air then flows to the air outlet 66 of the reactant air pathway 63 and upward toward the fan. A portion of the reactant air is then exchanged for fresh ambient air and the remaining portion is recirculated as disclosed in U.S. patent application No. 08/056,440, which is incorporated herein by reference.

The eight metal-air cells 64 generate 8 volts of electrical energy, which flow to the projection printed circuit board 108 via the battery supply connector 75. At the projection printed circuit board 108, the voltage is increased to 12 volts by the up-converter 114. From the up-converter 114, the 12 volt electrical energy flows to the portable computing device 22 via the device connector 112.

The user can monitor the charge status of the metal-air battery 82 directly from the display 46 as show in FIG. 1. The charge status is preferably displayed to the user as a level gauge 133 by the portable computing device 22.

To recharge the metal-air battery 82, the battery pack 20 is disassembled from the portable computing device 22 to expose the recharge jack 116. Disassembly is accomplished by disengaging the clips 142 from the mating openings 141 of the computing device 22 and sliding the battery pack 20 away from the front wall 53 of the computing device 22. The clips 142 must be moved sideways against the spring 146 to release them from the hooks 145, and then rotated out of the openings 142.

The metal-air battery 82 is recharged by connecting a recharger to the recharge jack 166. The electrical energy flows from the recharge jack 166 to the metal-air battery 82 via the projection printed circuit board 108. At the metal-air battery 82, the electrical energy is applied between the anode and cathode of the cells 64 which reverses the discharge electrochemical reaction. The battery 82 may be charged during operation of the computer provided the recharge jack 166 is accessible and the recharger is powerful enough for both tasks.

The hydrogen generated during recharging is vented from the cell housing 24 through the vents 94 to the space 47 and then generally to the atmosphere. A catalyst (not shown) may be provided in the space 47 and/or in the air flow path 63 for catalyzing a recombination of the generated hydrogen that might be present with oxygen as described in U.S. patent application Ser. No. 08/286,433, which is incorporated herein by reference. A thermocouple (not shown) or a thermistor (also not shown) may be used in conjunction with the catalyst to detect high concentrations of hydrogen gas in the space 47 by the temperature of the catalyst. The fan 88 could be configured to direct a flow of air into the spaces 47 and 63 if such a high concentration of hydrogen is detected. Alternatively, the fan 88 could be configured to direct a flow of air into the spaces 47 and 63 periodically during recharging as a safeguard.

During recharge, the microprocessor 113 sequentially monitors the two (2) groups of cells on either side of the center tap 87 according to a time based sequence. More particularly, the microprocessor 113 monitors the center tap 87 and the terminals 73 and 74 of the metal-air battery 82 via selection circuitry which is controlled by a first and a second set of control signals. The first set of control signals causes the selection circuitry to sequentially connect the voltage of the groups of the cells to a data input of the microprocessor 113 in accordance with an iterative time based sequence. To avoid needless accumulation of data and to utilize less memory, the microprocessor 113 implements a predetermined time delay between successive iterations of the time based sequence. Preferably, the time base sequence is sequential with respect to the order of the groups of cells. When the microprocessor 113 has collected charging data that indicates a predetermined charge cutoff limit has been reached by one of the groups, the microprocessor 113 causes the switching circuit to break the electrical connection between the battery 82 and the recharge power source.

Figure 14:
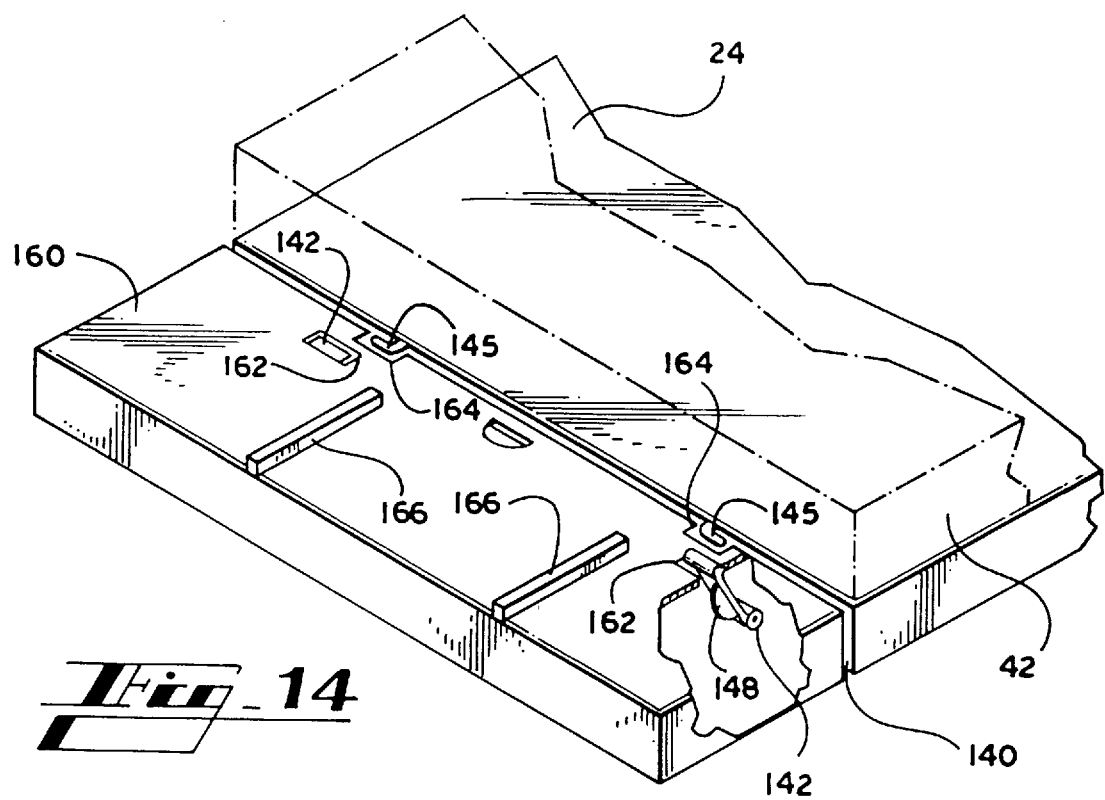
FIG. 14 is a perspective view of a docking platform for used in connection with a portable computing device to which the battery of the present invention is externally assembled.

As shown in FIG. 14, a docking platform 160 is provided for situations where a docking device (not shown) will be connected to the portable computing device 22. Use of the docking platform is preferred in docking situations because an unsupported docking device may damage the fragile connectors of the docking device or of the computer 22.

To allow attachment of the docking device, the pivotal clips 142 must be disengaged from the openings 141 of the portable computing device 22. The normal upstanding position of the clips 142 discourages attachment of the docking device without first installing the platform 160. A pair of bosses 166 are provided on the docking platform 160 to facilitate alignment of the docking device.

The docking platform 160 includes a pair of indentations 164 for receiving the hooks 145 and a pair of openings 162 for retaining the pivotal clips 142 below a plane of the upper surface 34 of the cell housing. The docking platform 160 is sized such that it has the same height as the cell housing 24. Thus, the docking device may be attached to the portable computing device 22 as if the battery pack 20 was non-existent.

An alternative embodiment of the present invention is shown in FIG. 15 as a battery pack 20'. The battery pack 20' is for use in connection with a portable computing device 22' of an alternative configuration in which the battery compartment 52' is open to the bottom of the portable computing device 22'. With such a configuration, there is no need for a projection assembly that extends in a spaced apart relation from the battery pack.

In this embodiment, a projection 26' extends upward from a cell housing 24' under the portable computing device 22'. Thus, neither the cell housing 24' nor the projection 26' extends out from under the portable computing device 22'. A palm rest is not shown but could be attached to the cell housing 24'.

The battery pack 20' operates in the same manner as the battery pack 20. Thus, ambient air enters openings 100' and flows toward the ventilation openings (not shown). When in operation, the solenoid 118' is energized and the pads 120' and 121' are retracted from the ventilation openings such that air enters the reactant air pathway (not shown). Power from a metal-air battery 82' is supplied to the portable computing device 22' through a device connector 110', which is electrically connected to a projection printed circuit board 108' that is in electrical contact with the metal-air battery 82'.

From the foregoing description of the preferred embodiments and the several alternatives, other alternative constructions of the present invention may suggest themselves to those skilled in the art. Therefore, the scope of the present invention is to be limited only by the claims below and equivalents thereof.

We claim:

1. In a metal-air battery, having an air chamber, said air chamber including front, rear, and first and second opposing side walls, an air inlet and an air outlet adjacent to one another along said front wall, and a reactant air pathway for directing air across a plurality of electrochemical cells, said electrochemical cells disposed in a generally rectangular array, said reactant air pathway comprising:

a network of barriers defining said reactant air pathway such that air is evenly disbursed about said air chamber and across said plurality of electrochemical cells, said network of barriers including;

a longitudinal barrier extending from said front wall between said air inlet and said air outlet to a position spaced from said rear wall;

at least one transverse internal spacer barrier extending from said longitudinal barrier to a position spaced from said first side wall;

at least one transverse peripheral spacer barrier extending, between said front wall and said internal spacer barrier, from said first side wall to a position spaced from said longitudinal barrier;

said transverse peripheral spacer barrier extending into a U-shaped barrier, the open end of which faces said first side wall.

2. The metal-air battery of claim 1, wherein said U-shaped barrier includes an arm extending closer to said front wall than to said transverse peripheral barrier.

3. The metal-air battery of claim 1, wherein said transverse internal spacer barrier extends into a second U-shaped barrier, the open end of said second U-shaped barrier facing said longitudinal barrier.

4. The metal-air battery of claim 3, further comprising a second internal spacer barrier extending from said longitudinal barrier to a position spaced from said first side wall, between said front wall and said transverse peripheral spacer barrier.

5. The metal-air batter of claim 4, wherein said second transverse internal spacer barrier extends into a third U-shaped barrier, the open end of said third U-shaped barrier facing said longitudinal barrier.

* * * * *